Oct. 19, 1926.

W. K. LJUNGDAHL 1,603,345

APPARATUS FOR THE PROCESS OF DESTRUCTIVE DISTILLATION OF ORGANIC MATTER

Original Filed Sept. 13, 1922

Inventor
Wm. K. Ljungdahl
By Athens & Athens
Attorneys

Patented Oct. 19, 1926.

1,603,345

UNITED STATES PATENT OFFICE.

WILLIAM K. LJUNGDAHL, OF BEND, OREGON, ASSIGNOR TO ALBERT W. COOPER, OF PORTLAND, OREGON.

APPARATUS FOR THE PROCESS OF DESTRUCTIVE DISTILLATION OF ORGANIC MATTER.

Continuation of application Serial No. 587,971, filed September 13, 1922. This application filed January 19, 1926. Serial No. 82,321.

Figure 1:
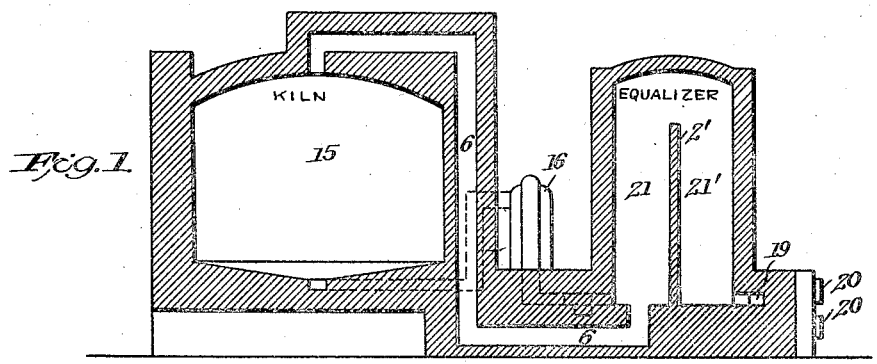
Figure 2:
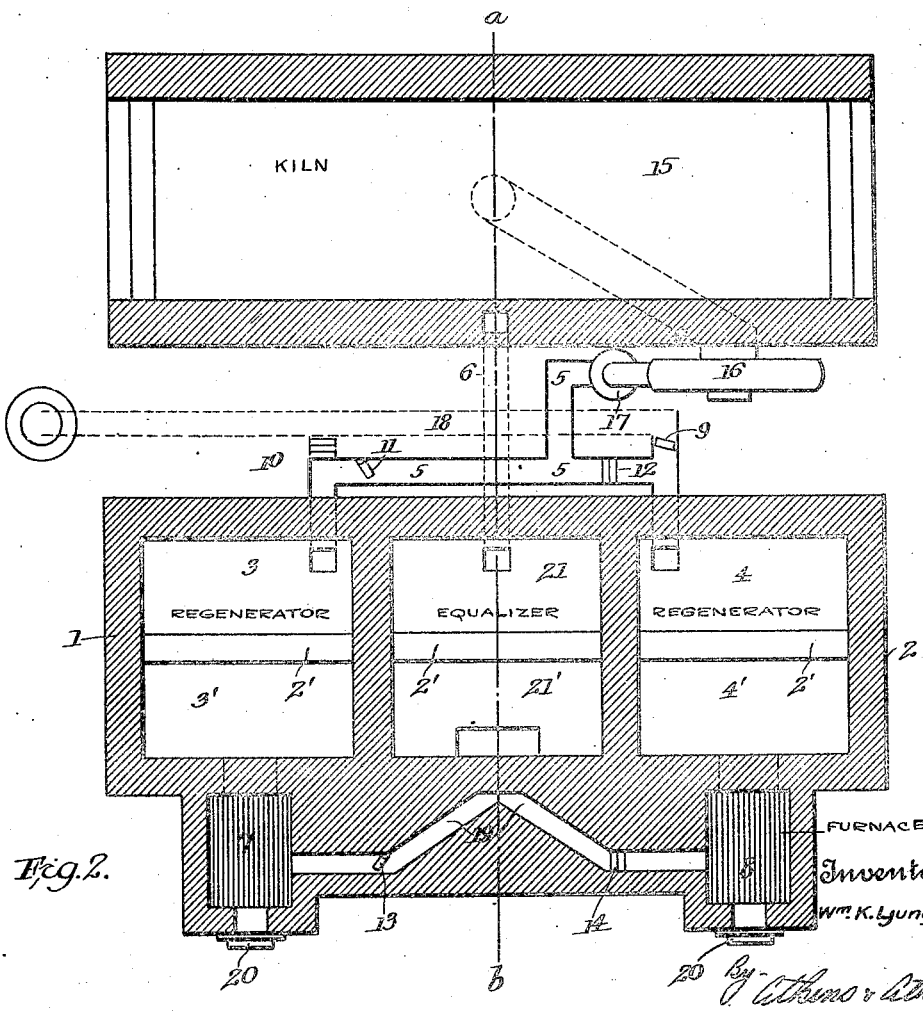

My invention relates especially to a regenerating apparatus and the construction thereof, which is used for regenerating gas in the destructive process. This application is a continuation of my forfeited application, Serial No. 587,971, filed Sept 13, 1922. The object of my invention is to provide a regenerator having chambers through which the gases employed as a destructive medium can be forced, heated and prepared for the kiln or retort in which they are to be used and a method of controlling the gases used in the process. The regenerator is especially constructed and adapted for employment in combination with kilns or retorts used in the destructive distillation of organic matter. I attain these objects by the mechanism illustrated in the accompanying drawing, in which the Figure 1 is a vertical longitudinal section along the line a—b in Figure 2. Figure 2 is a horizontal plan view of the regenerator on a smaller scale and associated with the kiln.

The generators 1 and 2 are identical in construction having chambers 3, 3' and 4, 4' and built of heat retaining material, and constructed practically as any regenerative by-product coke oven or the like. The chambers are all communicatively connected to the passages 5, 6 and 19. Furnaces 7 and 8 are built on to the regenerators in a communicative manner, so that the heat can be delivered to the regenerators 1 and 2. These two furnaces are equipped with air tight fire box doors 20. The flow of the gases through the entire apparatus is controlled by valves 9, 10, 11, 12, 13 and 14. The gases which are used as a destructive medium for the process of carbonization are forced into the regenerators from the retort or oven 15 by means of a fan through a condenser 17 then through the passage 5 past the valve 11 into the chambers of regenerator 1. Considering the valves to be in position as shown in the drawings with furnace 8 in operation, the gases of combustion generated in said furnace pass through the chambers 4 and 4', in the regenerator 2, and on by the valve 9 through the channel 18 and escape by the smokestack 18 to the outside atmosphere. It is understood that these gases last mentioned are forced through the regenerator 2 for the purpose of heating the walls of the chambers and that there are no other gases there at the time of their presence. With the valves 12 and 10 closed and valve 11 open, as indicated in the drawing the gases used as a carbonizing and heating medium are forced by the blower 16 and directed to the regenerator 1 through the channels 5 by the valve 11 to the chambers 3, 3'. Consider that the chambers 3, 3' in the regenerator 1 are in a heated condition, the gases passing through said chambers receive the heat therefrom and through the airtight shut furnace 7 and the channel 19 enter the chambers 21. The hot gases then leave through chamber 6 and enter the retort or oven 15 where they are used as a heating medium in the process of distillation. During the process last mentioned it is understood that the chambers 4, 4' are being heated by the products of combustion in the furnace 8. The regenerators 1 and 2 are alternately heated to a point that will permit the gases to enter the retort at the desired temperature when the temperature of the gases fall to a point too low for use as a heating medium, then the flow of the gases is by means of the valves described above directed to the regenerator 2. What I specifically consider as an improvement and invention is the arrangement of the chambers 21 and 21' constructed in between the two regenerators and in a communicative manner connected with them. This arrangement of the chambers 21 and 21' will serve to equalize the temperature, thereby greatly adding to the economy and efficiency of the regenerator plant in the following manner.

When the heated gases coming from the regenerator 1 enter into the chambers 21 and 21' at a high temperature, they will here be somewhat cooled off, thus delivering some of their heat to the walls of chambers 21 and 21' and then by a channel 6 enter the retort at the desired temperature. The temperature of the chambers of the regenerator 1 slowly decreases, then the heat of the walls in the chambers 21 and 21' will deliver their heat to the gases, and thus lengthen the operating time of the regenerator 1, and the work as an equalizer. When the gases finally reach the minimum point, the flow of the gases is directed through the regenerator 2 and the chambers 21 and 21' will again work as an equalizer. While the gases are forced through regenerator 1, the regenerator 2 is being heated and made ready for use, thus affording a continuous operation of the regenerating plant.

From the drawing it will be clearly understood while following these specifications how the heating medium is controlled, reheated and transferred to the kiln and gases being easily kept at a certain temperature by alternating the passage between the regenerators 1 and 2, and by the arrangement of the chambers 21 and 21' which work as an equalizing device. It will also be understood that the regenerators are being reheated while the other is delivering its heat to the gas to be used as a heating medium in the retort.

Having fully described my invention, I claim and desire to protect by Letters Patent:—

1. A device of the class described comprising an equalizing chamber, a plurality of heating chambers each provided with a communicating furnace and disposed adjacent said equalizing chamber, all of said chambers being constructed of heat retaining material, ducts independently connecting said heating chambers with the equalizing chamber, means for selectively cutting off communication between any of said heating chambers and the equalizing chamber, means for causing the passage of gases of combustion through any of said heating chambers when not connected with said equalizing chamber whereby to provide for the transmission of heat to the walls of the heating chambers, said equalizing chamber being provided with an outlet port adapted to direct the gases to a kiln, and the heating chambers having inlet ports adapted to receive gases from a kiln.

2. A device of the class described comprising an equalizing chamber, a plurality of heating chambers each provided with a communicating furnace, and disposed adjacent said equalizing chamber, said equalizing chamber being located between the heating chambers, and all of said chambers being constructed of heat retaining material, ducts independently connecting said heating chambers with the equalizing chamber, means for selectively cutting off communication between any of said heating chambers and the equalizing chamber, means for causing the passage of gases of combustion through any of said heating chambers when not connected with said equalizing chamber whereby to provide for the transmission of heat to the walls of the heating chambers, said equalizing chamber being provided with an outlet port adapted to direct the gases to a kiln, and the heating chambers having inlet ports adapted to receive gases from a kiln.

3. A device of the class described comprising an equalizing chamber, a plurality of heating chambers disposed adjacent said equalizing chamber and each provided with a communicating furnace, and all of said chambers being constructed of heat retaining material, ducts connecting said furnaces independently with the central chamber, means for selectively connecting said furnaces with both the equalizing chamber and a heating chamber, or with a heating chamber alone when the heat is to be transmitted to the walls of the latter by the gases of combustion, and said equalizing chamber being provided with an outlet port adapted to direct the gases to a retort, said outlet port being located so as to cause the gases to pass through said chamber before being discharged therefrom, and the heating chambers having inlet ports adapted to receive gases from a kiln.

4. A device of the class described comprising an equalizing chamber, a plurality of heating chambers disposed adjacent said equalizing chamber and each provided with a communicating furnace, said equalizing chamber being located between the heating chambers, and all of said chambers being constructed of heat retaining material, ducts connecting said furnaces independently with the central chamber, means for selectively connecting said furnaces with both the equalizing chamber and a heating chamber, or with a heating chamber alone when the heat is to be transmitted to the walls of the latter by the gases of combustion, and said equalizing chamber being provided with an outlet port adapted to direct the gases to a retort, said outlet port being located so as to cause the gases to pass through said chamber before being discharged therefrom, and the heating chambers having inlet ports adapted to receive gases from a kiln.

5. In a device of the class described, an equalizing chamber, heating chambers in communication with said equalizing chamber, a furnace in communication with each of said heating chambers, ducts leading from said heating chambers to the equalizing chamber, ducts leading from the heating chamber to a stack, means for closing either of said ducts whereby the heating chambers may be selectively cut-off from communication with either the stack or the equalizing chamber and the chambers alternately placed in communication with the equalizing chamber, means for permitting the passage of gases of combustion through each of said heating chambers from its furnace when the heating chambers are not in communication with the equalizing chamber, all of said chambers being constructed of heat retaining material.

In testimony whereof, I have hereunto set my hand.

WILLIAM K. LJUNGDAHL.